(12) United States Patent
Gutierrez, Jr.

(10) Patent No.: US 6,316,982 B1
(45) Date of Patent: Nov. 13, 2001

(54) DIGITAL CLOCK WITH CONTROLLABLE PHASE SKEW

(75) Inventor: Alberto Gutierrez, Jr., Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/540,363

(22) Filed: Mar. 31, 2000

Related U.S. Application Data

(60) Provisional application No. 60/132,554, filed on May 5, 1999.

(51) Int. Cl.$^7$ ................................................ G06F 1/04
(52) U.S. Cl. ..................... 327/298; 327/236; 327/241; 327/166; 327/160
(58) Field of Search ............................ 327/291, 298, 327/295, 231–236, 237, 241, 144, 151, 160, 162, 165–166, 170, 113, 114; 375/371, 375, 362, 373; 331/17, 25, 1 A

(56) References Cited

U.S. PATENT DOCUMENTS

| | | | |
|---|---|---|---|
| 5,012,198 | * | 4/1991 | Okada et al. ............... 327/152 |
| 5,271,040 | * | 12/1993 | Clark ........................... 375/327 |
| 5,781,054 | * | 7/1998 | Lee ............................. 327/231 |

* cited by examiner

Primary Examiner—Timothy P. Callahan
Assistant Examiner—Minh Nguyen
(74) Attorney, Agent, or Firm—J. Dennis Moore; W. James Brady, III; Frederick J. Telecky, Jr.

(57) ABSTRACT

A method and apparatus for generating an output clock signal having a frequency $f_O$ derived from a reference clock signal having a frequency $f_R$, such that $$f_O = \frac{M}{N} f_R,$$

is satisfied, wherein M and N are integers and M<N. In the method, a plurality of intermediate clock signals are provided having a frequency $f_X$, such that $$f_X = \frac{1}{X} f_R,$$

wherein X is an integer close in value to N/M, and having a predetermined phase relationship with respect to one another. Selection is made among the intermediate clock signals to provide the output clock signal according to a predetermined sequence applied so as to cause a phase correction at each change of selection such that the cumulative phase correction results in the output clock signal having, on average, the frequency $f_O$.

4 Claims, 5 Drawing Sheets

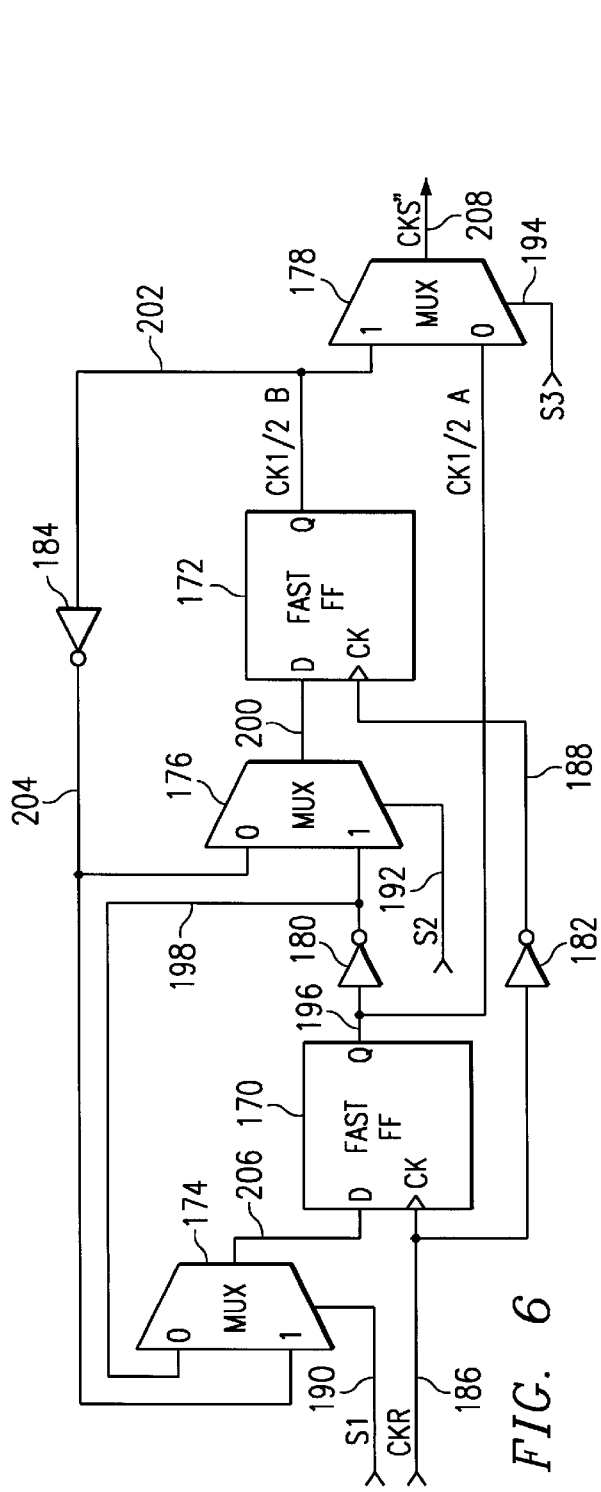
FIG. 6
FIG. 7
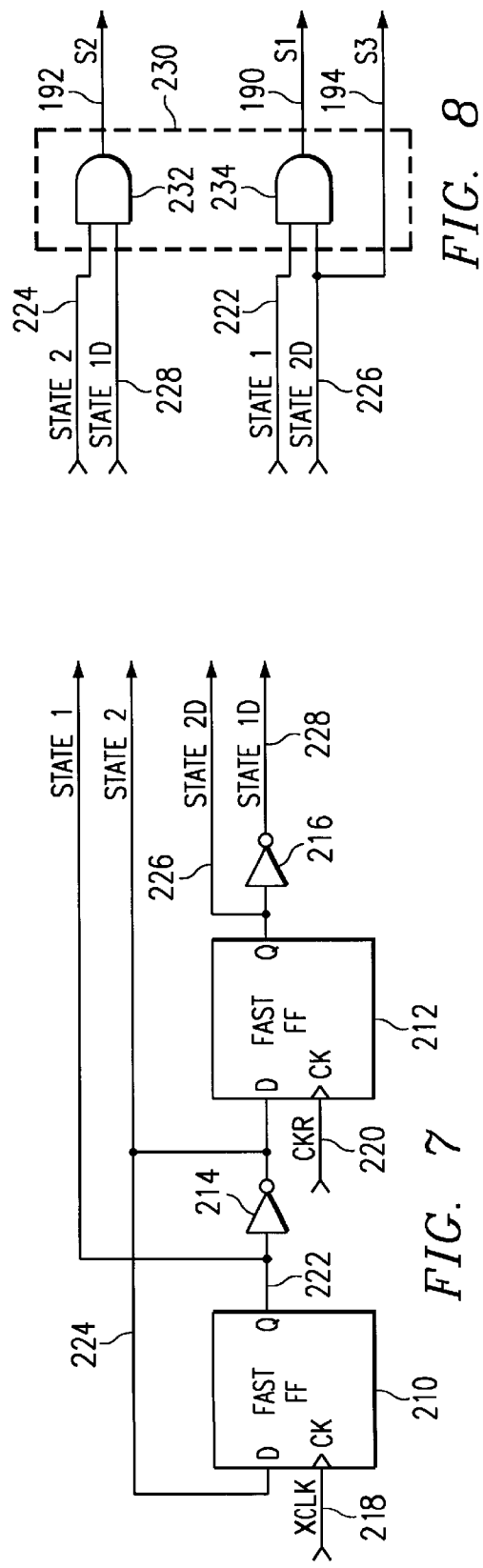
FIG. 8

DIGITAL CLOCK WITH CONTROLLABLE PHASE SKEW

This application claims priority under 35 U.S.C. §119(e)(1) of provisional application number 60/132,554 filed May 5, 1999.

TECHNICAL FIELD OF THE INVENTION

This invention relates to clock circuits, and more particularly relates to digital clocks having phase control of the clock output. The invention has application, for example, to wireless communications systems.

BACKGROUND OF THE INVENTION

Many circuits require one or more clock signals for their operation. Such clock signals are typically provided by clock generator circuits, or, simply, clock circuits, that are driven by a reference clock signal that is provided from a source external to the clock circuit.

It is desirable to synthesize a clock circuit from circuitry comprised common digital circuits found in a typical VLSI standard cell library. Such common digital circuits include NAND gates, NOR gates, and FLIP-FLOPS. In this way, a clock generation circuit can be manufactured efficiently with respect to reliability and cost. On the other hand, common clock circuit techniques involve the use of PLL's and frequency dividers. However, PLL's and dividers are usually comprised of special analog components. For example, even a digital phase lock loop requires a special analog circuit known as a phase detector. Furthermore, it is often required to accompany a digital phase lock loop with external analog components such as capacitors.

Digital clocks are clock circuits implemented entirely in digital circuitry, and thus avoid the aforementioned problems. It is desired to provide a digital clock having the capability of deriving an output clock signal from a reference clock signal, where the output clock signal is a rational number multiple of the reference clock. In other words, given a reference clock provided at a frequency $f_R$, the present invention provides an output clock having a frequency $f_O$, such that $$f_O = \frac{M}{N} f_R,$$

wherein M and N are integers, and M<N.

For example, in a code division multiple access ("CDMA") receiver unit, a reference clock may be provided at a frequency, $f_R$, of 19.2 MHz, while it is desired to provide an system clock for the receiver system at a frequency, $f_O$, of 9.8304 MHz. A frequency of 9.8304 MHz is equal to 19.2 MHz multiplied by 64/125. In other words, in this case, M is 64 and N is 125.

Now, a divide-by-two situation would be presented in this case if N were 128. However, such is not the case, and so a simple divide-by-two clock divider circuit is not available to provide this system clock.

Further, in CDMA applications, for example, it would be advantageous to provide a clock generator having the above-described capability, wherein the clock generator is also continuously controllable. In such applications, the circuits driven by the clock generator are attempting to track individual signals of multiple path signals arriving at the receiver. Each such signal may itself be changing in phase, for example as the receiver unit moves around in the vicinity of a base station. It would be useful to be able to change the frequency of the clock driving these circuits, to aid in the tracking process. And, it would be desirable to effect this control in a way that is easily accessible to software running on a system in which the circuits are utilized.

Accordingly, it is desired to provide a digital clock generator that permits the generation of an output clock from a reference clock, wherein the output clock is a rational number multiple of the reference clock. Further, it is desired to provide such a digital clock generator having programmable control over the rational number multiplier. The present invention provides such a clock generator.

SUMMARY OF THE INVENTION

In accordance with the present invention there is provided a method and apparatus for generating an output clock signal having a frequency $f_O$ derived from a reference clock signal having a frequency $f_R$, such that $$f_O = \frac{M}{N} f_R,$$

is satisfied, wherein M and N are integers and M<N. In the method, a plurality of intermediate clock signals are provided having a frequency $f_X$, such that $$f_X = \frac{1}{X} f_R,$$

wherein X is an integer close in value to N/M, and having a predetermined phase relationship with respect to one another. Selection is made among the intermediate clock signals to provide the output clock signal according to a predetermined sequence applied so as to cause a phase correction at each change of selection such that the cumulative phase correction results in the output clock signal having, on average, the frequency $f_O$.

These and other features, aspects and embodiments of the invention will be apparent to those skilled in the art from the following detailed description of the invention, taken together with the accompanying drawings.

BRIEF DESCRIPTION OF THE DRAWINGS

FIG. 6 is, along with FIGS. 7 and 8, a third preferred embodiment of the present invention;

FIG. 7 is, along with FIGS. 6 and 8, a third preferred embodiment of the present invention;

FIG. 8 is, along with FIGS. 6 and 7, a third preferred embodiment of the present invention.

DETAILED DESCRIPTION OF THE PREFERRED EMBODIMENTS

Figure 1:
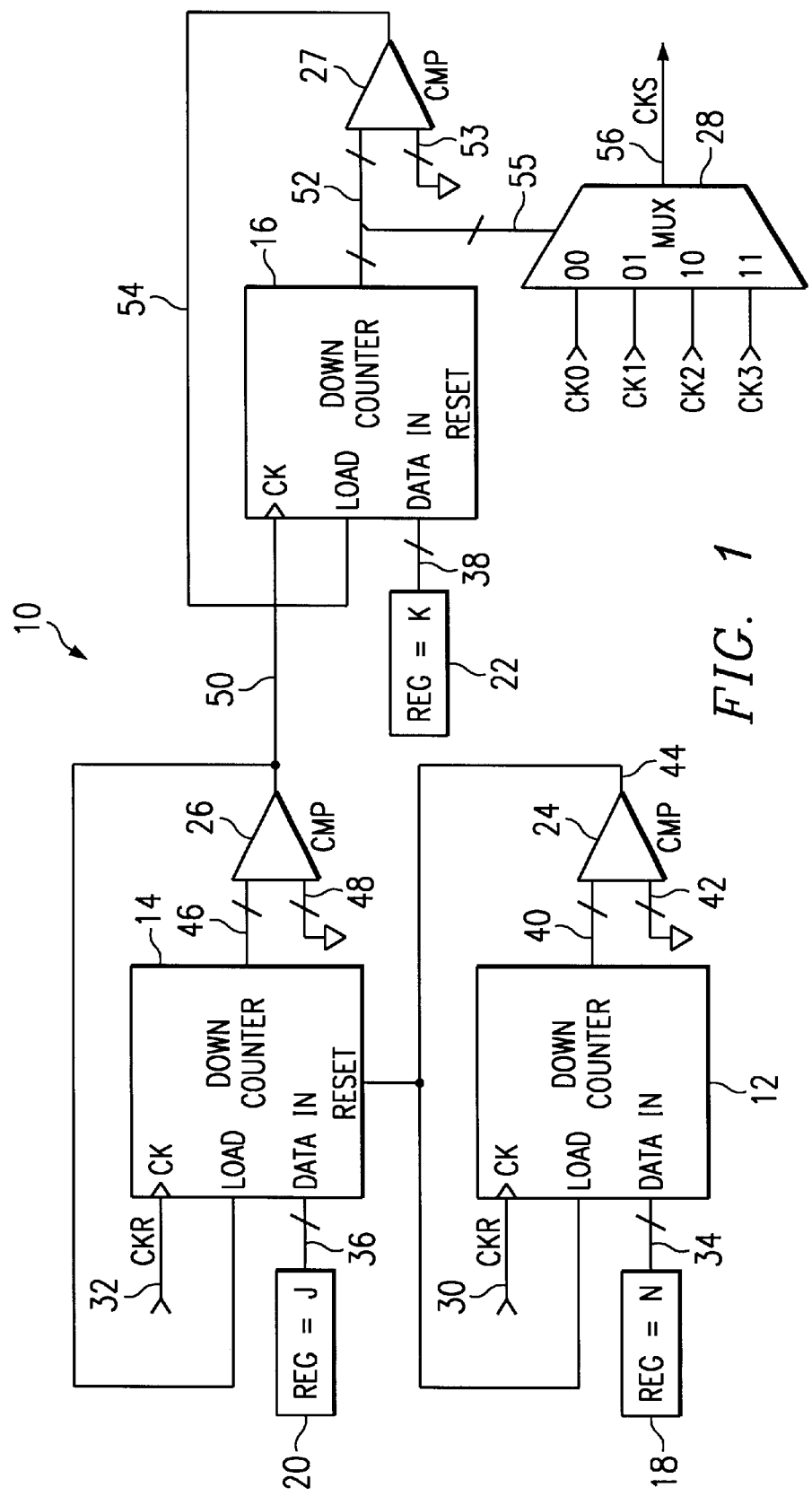
FIG. 1 is a logic diagram of a digital clock 10 according to a first preferred embodiment of the present invention, operating in conjunction with the logic circuit shown in FIG. 2.
Figure 2:
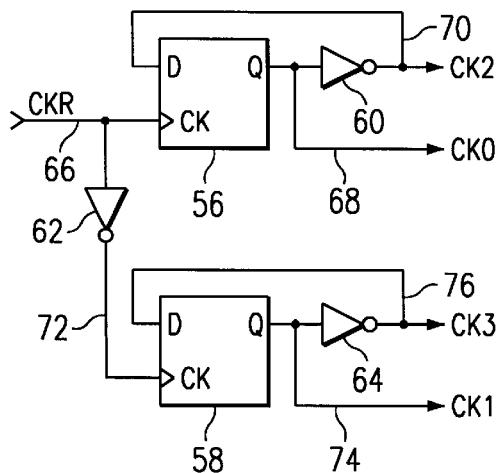
FIG. 2 is a digital logic arrangement providing Clocks CK0, CK1, CK2 and CK3 for the digital clock 10 of FIG. 1.

FIG. 1 is a logic diagram of a digital clock 10 according to a first preferred embodiment of the present invention, operating in conjunction with the logic circuit shown in FIG. 2. In digital clock 10, a reference clock signal at a frequency of $f_R$ is provided as an input, and an output signal is generated at a frequency $f_O$, such that $$f_0 = \frac{M}{N} f_R,$$

which, it will be recalled, is Equation (1). In digital clock 10, at least one intermediate clock signal is generated having an intermediate frequency $f_X$, such that $$f_X = \frac{1}{X} f_R,$$

wherein X is an integer close in value to $$\frac{N}{M},$$

wherein X may be expressed as the fraction $$\frac{P}{M}.$$

Also in digital clock 10, a predetermined number of phase corrections are made of a predetermined magnitude, the magnitude having a predetermined time relationship to the period of the reference clock signal, to the intermediate clock signal at predetermined times, described in detail below, such that over M periods of the reference clock signal |P-N| corrections of the predetermined magnitude to the intermediate clock signal are effectively made in the appropriate phase direction so as to derive the output clock signal such that the overall frequency of the output clock signal over time satisfies equation (1).

In digital clock 10 of FIG. 1 are a first down counter 12, a second down counter 14, a third down counter 16, a first register 18, a second register 20, a third register 22, a first comparator 24, a second comparator 26, a third comparator 27, and a four-input multiplexer 28. In the circuit of FIG. 1, as with all circuits described herein, the CLOCK inputs of devices are rising edge triggered, unless otherwise specified.

A reference clock signal CKR is provided on input line 30 to the CLOCK input of down counter 12 and on input line 32 to the CLOCK input of down counter 14. The value stored in register 18 is provided on line 34 to the DATA IN input of down counter 12, while the value stored in register 20 is provided on line 36 to the DATA IN input of down counter 14, and the value stored in register 22 is provided on line 38 to the DATA IN input of down counter 16. A clock signal CK0 is provided to the 00 input of multiplexer 28, a clock signal CK1 is provided to the 01 input of multiplexer 28, a clock signal CK2 is provided to the 10 input of multiplexer 28, while a clock signal CK3 is provided to the 11 input of multiplexer 28.

The output of down counter 12 is provided on bus 40 to a first input of comparator 24. The other input of comparator 24 is connected via bus 42 to ground, i.e., the digital value zero. The output of comparator 24 is connected to line 44. Line 44 is provided to the LOAD input of down counter 12 and to the RESET input of down counter 14. The output of down counter 14 is provided on bus 46 to a first input of comparator 26. The other input of comparator 26 is connected via bus 48 to ground, i.e., the digital value zero. The output of comparator 26 is connected to line 50. Line 50 is provided to the LOAD input of down counter 14 and to the CLOCK input of down counter 16.

The output of down counter 16 is provided on bus 52 to a first input of comparator 27 and to the SELECT input of multiplexer 28. The other input of comparator 27 is connected via bus 53 to ground, i.e., the digital value zero. The output of comparator 27 is connected to line 54. Line 54 is provided to a LOAD input of down counter 16. The output of multiplexer 28 is the system clock CKS, and is provided on line 56.

Clocks CK0, CK1, CK2 and CK3 are provided by the digital logic shown in FIG. 2. In FIG. 2 is a first D,Q flip-flop 56 and a second D,Q flip-flop 58, a first inverter 60, a second inverter 62 and a third inverter 64.

The reference clock signal CKR is provided on input line 66 to the CLOCK input of flip-flop 56 and to the input of inverter 62. The Q output of flip-flop 56 is provided to line 68, which is provided to the input of inverter 60 and which is the CK0 clock output. The output of inverter 60 is provided to line 70, which is provided to the D input of flip-flop 56, and which is the CK2 clock output.

The output of inverter 62 is provided, via line 72, to the CLOCK input of flip-flop 58. The Q output of flip-flop 58 is provided to line 74, which is provided to the input of inverter 64 and which is the CK1 clock output. The output of inverter 64 is provided to line 76, which is provided to the D input of flip-flop 58, and which is the CK3 clock output.

Figure 3:
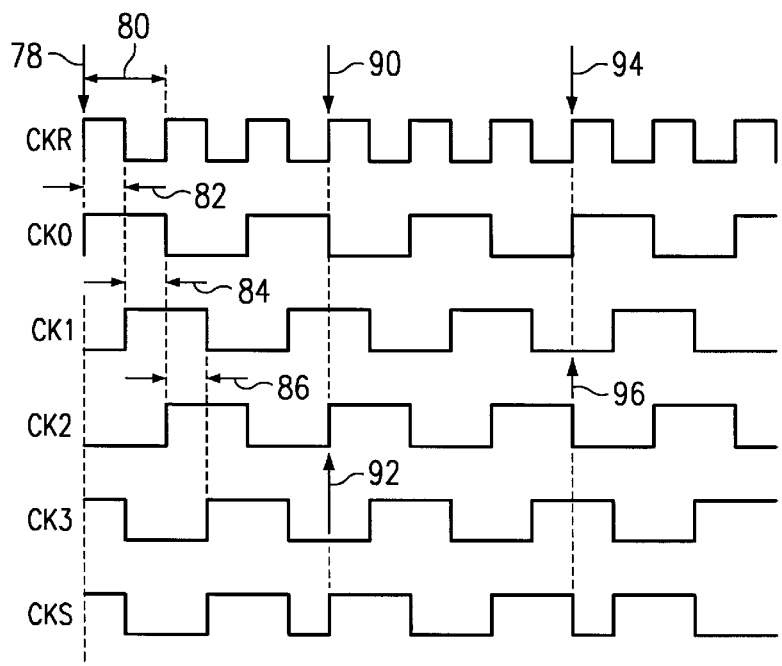
FIG. 3 is a signal timing diagram showing the time relationship between clock signals CKR, CK0, CK1, CK2, CK3 and CKS, of FIGS. 1 and 2.

FIG. 3, is a signal timing diagram showing the time relationship between clock signals CKR, CK0, CK1, CK2, CK3 and CKS, with the X-axis representing time, and the Y-axes representing signal level of the respective clock signals, where the signal level for each of the respective clocks corresponds either to a digital "0" or "1." It can be seen that the period for clock CKR is represented by interval 80. The periods for clocks CK0, CK1, CK2, CK3 and CKS, are all the same, being twice the period for clock CKR. Clock CK0 has the same phase as clock CKR. This is because clock CK0 is the output of flip-flop 56 (FIG. 2), which has as its input clock CKR. Clock CK1 is phase delayed, with respect to clock CK0, by interval 82, which is half the period of clock CKR. This is because clock CK1 is the output of flip-flop 58 (FIG. 2), which has as its clock input the inverse of clock CKR, i.e., clock CKR delayed by half of its period. Clock CK2 is phase delayed, with respect to clock CK1, by interval 84, which is half the period of clock CKR. This is because clock CK2 is the output of inverter 60 (FIG. 2), whose input is the output of flip-flop 56, i.e., clock CK0, where the inverting of clock CK0 corresponds to a phase shift of ½ the period of CK0 and one period phase shift with respect to clock CKR. Clock CK3 is phase delayed, with respect to clock CK2, by interval 86, which is half the period of clock CKR. This is because clock CK3 is the output of inverter 64 (FIG. 2), whose input is the output of flip-flop 58, i.e., clock CK1, where the inverting of clock CK1 corresponds to a phase shift of ½ the period of CK1 and 1½ period phase shift with respect to clock CKR. Clocks CK0, CK1, CK2 and CK3, are thus separated, respectively, by one fourth of their common period.

The operation of FIG. 1 will now be described using the same example as that set forth in the Background of the Invention, that is, the reference clock CKR has a frequency of $f_R$, and the system clock CKS generated as an output has a frequency $f_O$ such that $$f_O = \frac{M}{N} f_R,$$

wherein M and N are integers. Specifically, in this example, $f_R$ is 19.2 MHz and $f_O$ is 9.8304 MHz. Since 9.8304 is equal to 19.2 multiplied by 64/125, M is 64 and N is 125. Now, it is noted that 19.2 divided by 2 yields 8.6, which is close to the desired value of 9.8304. By comparison of M/N to ½, it can be seen that to move from ½ to M/N, one goes from 64/128 to 64/125. Thus, the numerators of those two fractions are the same, but the denominators differ by three= 128−125. The application of the principles of the present invention takes advantage of this understanding.

In operation, this embodiment performs a divide by two (64/128) operation on the reference clock CKR, but the period of the output clock CKS is effectively shortened such that 128−125=3 cycles of the CKR clock are added to clock CKS during this interval. In other words, 64 CKS cycles are provided for every 125 CKR cycles.

Another way of deriving the number of phase corrections is as follows. Without any phase corrections the circuit will output 64 CKS cycles for every 128 CKR cycles; however, the objective is to obtain 64 CKS cycles every 125 CKR cycles. Note that without any CKS corrections, over an interval corresponding to 125 CKR cycles there are 62.5 CKS cycles. The required phase correction applied to the CKS clock is M−62.5=1.5 (M=64) cycles or correspondingly 3 CKR cycles. Thus, since each correction corresponds to ½ of a CKR period then 6 such corrections are required on CKS corresponding to 1.5 cycles of CKS. This produces an output clock CKS frequency $f_O$ that is 64/125 times the reference clock CKR frequency $f_R$, which is the desired result.

Referring to FIG. 3, Clock CKS is initially, at time 78, in phase with clock CK3. However, at time 90, the phase of clock CKS shifts to align with clock CK2, as shown by transition arrow 92. Later, at time 94, the phase of clock CKS shifts to align with clock CK1, as shown by transition arrow 96. Each such phase shift provides a shortening (i.e., correction of clock CKS). Each correction is effected by cycling through the available clock phases by counting backward continuously as CK1→CK0→CK3→CK2→CK1→CK0, and so forth. Note that the number of cycles depicted in FIG. 3 between transitions is arbitrary. The figure merely illustrates what happens at transitions. The timing at which the actual transitions occur is described hereinbelow.

The divide by two operation for clocks CK0, CK1, CK2 and CK3, that occurs in the circuitry of FIG. 2, effects the initial approximation of 64/128 times the frequency of CKR. Note in FIG. 1 that the output CKS on line 56 is derived from these clocks CK0, CK1, CK2 and CK3, which are selected by MUX 28. The circuitry of FIG. 1 accomplishes the necessary correction by providing the appropriate signal on bus 55 to the select input of MUX 28, to provide the ultimate result of 64/125 times the frequency of CKR.

Now, turning to FIG. 1, the value J is N divided by the number of corrections, where the corrections are counted in units of half periods of clock CKR, such that the total number of corrections are executed over N periods of CKR. In the example with respect to this discussion, the number of corrections correspond to 128−125=3 full periods of clock CKR, but since corrections are made in units of half periods of CKR then there are a total of 2×3=6 corrections. Therefore, J=125÷6=20. Note that J is the integer part of the division operation. We see that the counter 14 with the corresponding register 20 and value J effectively distribute the corrections over the N cycles of clock CKR. This leads to less clock jitter compared to making corrections all at once and with corrections of larger magnitude such as corrections corresponding to a full period of clock CKR.

The value K is the number of phase changes corresponding to the number of constituent clocks, for example, clocks CK0, CK1, CK2, and CK3, used to realize the corrections to CKS. Thus, K is a measure of the granularity of correction. A higher value of K means that more corrections, and correspondingly smaller corrections, are made across the M periods of CKS to effect the desired overall J corrections. In the example being used in this discussion, K is 4, i.e., binary 11 (note that counting begins at binary 00). Thus four clocks, CK0, CK1, CK2 and CK3, are used, each with a different phase of ¼ period of CKS. Finer granularity would be afforded by a value K of 8, i.e., binary 111. Eight clocks, each with a different phase of ⅛ period of CKS would be used in such case. And so on. K is loaded into register 22.

In operation, for example using the conditions just discussed, initially register 18 is loaded with the value N, i.e. 125 (the register is loaded with the corresponding binary value). In addition, register 20 is loaded with the value J, i.e. 20 (the register is loaded with the corresponding binary value). Note that the actual binary values loaded in registers 18 and 20 are one less than N and J, respectively, since zero is included in the counting. The same is true for the value loaded into register 22. Thus, register 22 is loaded with a binary value corresponding to the value K, i.e., 4, less one. Counter 12 is loaded with the value stored in register 18 and counter 14 is loaded with the value stored in register 20. Then, in response to the CKR signal at the CLOCK input, counter 12 begins counting down from 125 by one every CKR period. Simultaneously, counter 14 begins counting down from 20 by one every CKE period.

When the value at the output of counter 14, on bus 46, is zero, the comparison in comparator 26 against the zero value on bus 48 is true. As a result, line 50, the output of comparator 26, goes high for one cycle. This causes a count down of one in counter 16 which is reflected in the output on bus 52, which causes a change in the selection in MUX 28 from "11" to "10", effecting the shift 92 shown in FIG. 2. It also causes a re-load down counter 14, which begins its down count from the value 20 (corresponding to J), again.

The next time counter 14 counts down to zero, and as a result the output of comparator 26, goes high for one cycle, zero line 50, the output of comparator 26, again goes high for one cycle. This causes another count down of one in counter 16 which is reflected in the output on bus 52, and which causes a change in the selection in MUX 28 from "10" to "01", and so forth.

Every 4 (K) counts of down counter 16 the value on bus 52 is zero, so that the comparison in comparator 27 against the zero value on bus 53 is true. As a result, line 54, the output of comparator 27, goes high for one cycle. This causes down counter 16 to re-load and begin its count down again from 4. This keeps the MUX 28 cycling regularly between its respective inputs.

Down counter 12 counts down from 124 (M) to 0. When bus 40, the output of counter 12, goes to zero, so that the comparison in comparator 24 against the zero value on bus 42 is true. As a result, line 44, the output of comparator 24 goes high for one cycle. This causes down counter 14 to reset, starting its cycle again. The counter reloads on reset.

The net result of the foregoing is that every N cycles of CKR J corrections are made to clock CKS of order magnitude ½ CKR, or ¼ CKS. Thus, the desired result is obtained.

Figure 4:
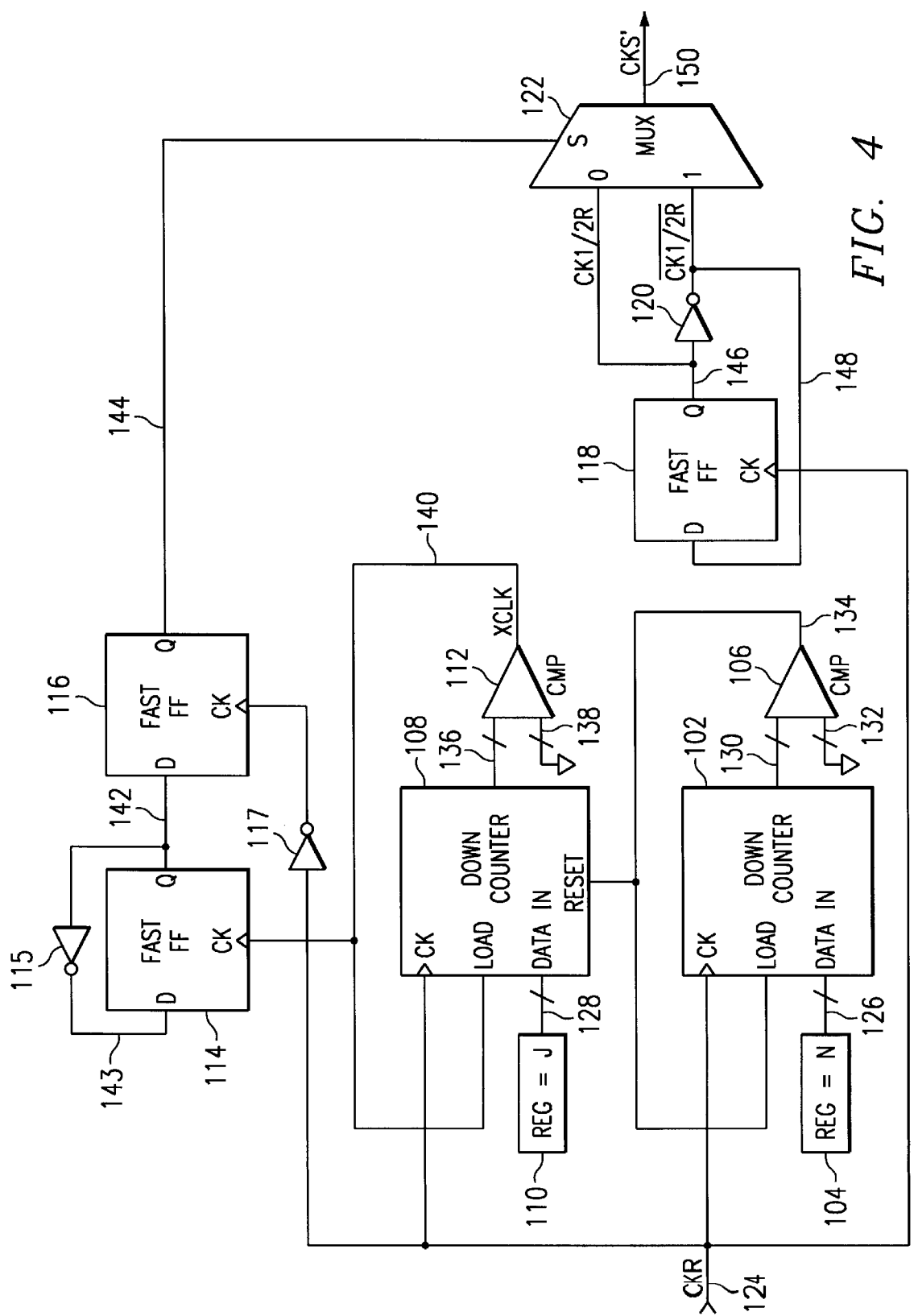
FIG. 4 is a logic diagram of a second preferred embodiment of the present invention.

A second preferred embodiment is shown in FIG. 4. In FIG. 4 are a first down counter 102, a first register 104, a first comparator 106, a second down counter 108, a second register 110, a second comparator 112, a first fast flip-flop 114, a second fast flip-flop 116, a third fast flip-flop 118, a first inverter 115, a second inverter 117, a third inverter 120 and a multiplexer ("MUX") 122.

Reference clock signal CKR is provided on input line 124 to the CLOCK input of down counter 102, to the CLOCK input of down counter 108, to the input of inverter 117 and to the CLOCK input of fast flip-flop 118. The value stored in register 104 is provided on bus 126 to the DATA IN input of down counter 102, while the value stored in register 110 is provided on bus 128 to the DATA IN input of down counter 108.

The output of down counter 102 is provided on bus 130 to a first input of comparator 106. The other input of comparator 106 is connected via bus 132 to ground, i.e., the digital value zero. The output of comparator 106 is provided on line 134 to the LOAD input of down counter 102 and to the RESET input of down counter 108.

The output of down counter 108 is provided on bus 136 to a first input of comparator 112. The other input of comparator 112 is connected via bus 138 to ground, i.e., the digital value zero. The output of comparator 112, the resultant clock signal XCLK, is provided on line 140 to the LOAD input of down counter 108 and to the CLOCK input of fast flip-flop 114.

The Q output of fast flip-flop 114 is provided on line 142 to the D input of fast flip-flop 116 and to the input of inverter 115. The output of inverter 115 is provided on line 143 to the D input of fast flip-flop 114. The Q output of fast flip-flop 116 is provided on line 144 to the SELECT input of MUX 122. CK1/2X The Q output of fast flip-flop 118, which is the signal CK1/2R, is provided on line 146 to the input of inverter 120 and to the "0" input of MUX 122. The output of inverter 120, which is the signal $\overline{CK1/2R}$, is provided to the "1" input of MUX 122 and to the D input of fast flip-flop 118.

The output of MUX 122, which is the clock signal CKS', is provided line 150.

Figure 5:
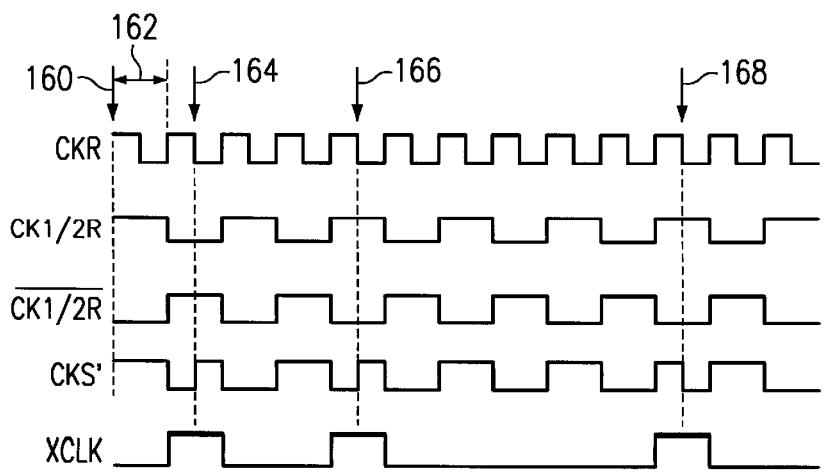
FIG. 5 is a signal timing diagram showing the time relationship between clock signals CKR, CK1/2R, $\overline{CK1/2R}$ and CKS', of FIG. 4.

FIG. 5 is a signal timing diagram showing the time relationship between clock signals CKR, CK1/2R, $\overline{CK1/2R}$, CKS' and XCLK, with the X-axis representing time, and the Y-axes representing signal level of the respective clock signals, where the signal level for each of the respective clocks corresponds either to a digital "0" or "1." The period for clock CKR is represented by interval 162 in this diagram. The periods for clocks CK1/2R and $\overline{CK1/2R}$ are the same, being twice the period for clock CKR. Clock $\overline{CK1/2R}$ is the inverse of clock CK1/2R, and is therefore 180° out of phase with clock CK1/2R. Clock CKS' is the system clock, which has the same overall timing relationship to clock CKR as clock CKS (FIGS. 1 and 3), but which achieves such overall timing relationship in a manner modified with respect to that of the arrangement of FIGS. 1 and 2. Similar to clock CKS (FIG. 3), Clock CKS' is initially, at time 160, in phase with clock CK1/2R. However, at time 164, the phase of clock CKS' shifts to align with clock $\overline{CK1/2R}$. Later, at time 166, the phase of clock CKS' shifts to align again with clock CK1/2R. The timing of the correction of clock CKS' by these phase steps, alternating between clocks CK1/2R and $\overline{CK1/2R}$, is controlled by the circuit shown in FIG. 4, the operation of which will now be described.

As in the circuit of FIGS. 1 and 2, this embodiment performs a divide by two (64/128) operation on the reference clock CKR, but the period of the output clock CKS' is effectively shortened such that 128−125=3 cycles of clock CKR are added to clock CKS during this interval. This produces an output clock CKS' frequency $f_O$ that is 64/125 times the reference clock CKR frequency $f_R$, which is the desired result. In this case, unlike the former, the actual corrections are by a period of CKR.

Referring now to FIG. 4, clock CKR is applied to the CLOCK input of fast flip-flop 118, which has a negative feedback path, through inverter 120, from its Q output to its D input. As a result, fast flip-flop 118 performs a divide-by-two on clock CKR. Clock CK1/2R is provided at the Q output of fast flip-flop 118, on line 146, while clock $\overline{CK1/2R}$, is provided at the output of inverter 120, on line 148. As mentioned above, clock $\overline{CK1/2R}$ is 180° out of phase with clock CK1/2R. Clock CK1/2R is provided to the "0" input of MUX 122, while clock $\overline{CK1/2R}$, is provided to the "1" input of MUX 122.

The transitions between clock CK1/2R and clock $\overline{CK1/2R}$ for clock CKS' occur in response to the signal on line 144 applied to the SELECT input of MUX 122. This occurs as follows.

Down counter 108 is initially loaded with the value J, i.e., 41, since in this case each correction is by a full CKR period (J=integer part of 125/3=41). Like down counter 102, it is clocked by clock CKR. Thus, every 21 cycles of clock CKR the output of counter 108 goes to zero for one cycle of clock CKR. When the value at the output of counter 108, on bus 136, is zero, the comparison in comparator 112 against the zero value on bus 138 is true. As a result, line 140, the output of comparator 112, goes high for one cycle. This causes two things to occur; down counter 108 loads the value J from bus 128, and fast flip-flop 114 is clocked.

Fast flip-flop 114 is configured as a toggle that changes states when clocked, due to the negative feedback path from its Q output to its D input through inverter 115. Thus, when XCLK on line 140 goes high, the Q output of flip-flop 114 changes state in response to the detected rising edge. This state, provided on line 142, is passed through fast flip-flop 116, which is clocked by the inverse of clock CKR. Fast flip-flop 116 controls the delivery to the SELECT input of MUX 122 of the value placed on line 142 by fast flip-flop 114. Since, as mentioned above, the CLOCK input of fast flip-flop 116 is rising edge triggered, the state on line 142 is delivered to line 144, and thus to the SELECT input of MUX 122, one half cycle of clock CKR after fast flip-flop 114 is triggered to change state.

At system start the Q output of fast flip-flop 114 is at a "0" state. Thus, when line 140 goes high for one cycle, the Q output of fast flip-flop 114 changes from low to high, i.e., from "0" to "1". This is delivered to the D input of fast flip-flop 116 on line 142, and thence to the SELECT input of MUX 122 on line 144.

This change of state from "0" to "1" on line 144 causes a change of the selection in MUX 122 from clock CK1/2R at the "0" input of MUX 122 to $\overline{CK1/2R}$ at the "1" input of MUX 122 as the clock signal delivered to the output of MUX 122 to constitute clock CKS'. Referring to FIG. 5, such a selection change is depicted at time 164, which can be seen is at a falling edge of clock CKR (rising edge of its inverse—output of inverter 117). Note the effective shortening, by a half of its low half cycle, and by a half of its high half cycle, of clock CKS' at time 164 as a result of this selection change.

Referring again to FIG. 4, the next time down counter 108 counts down from 20 and the output of counter 108 goes to zero for one cycle of clock CKR, fast flip-flop 114 toggles down to a "0". Through the sequence described above this "0" is delivered through fast flip-flop 116 to the SELECT input of MUX 122, which causes a change of the selection in MUX 122 from clock $\overline{CK1/2R}$ at the "1" input of MUX 122 to CK1/2R at the "0" input of MUX 122 as the clock signal delivered to the output of MUX 122 to constitute the system clock CKS'. Referring again to FIG. 5, such a selection change is depicted at time 166. Similar to what occurs at time 164, note the effective shortening by a half of the low half cycle, and a half of the high half cycle, of clock CKS' at time 166 as a result of this selection change.

Referring again to FIG. 4, the next time down counter 108 counts down from 20 and the output of counter 108 goes to zero for one cycle of clock CKR, fast flip-flop 114 toggles up to a "1". Through the sequence described above this "1" is delivered through fast flip-flop 116 to the SELECT input of MUX 122, which causes a change of the selection in MUX 122 from clock CK1/2R at the "0" input of MUX 122 to $\overline{CK1/2R}$ at the "1" input of MUX 122 as the clock signal delivered to the output of MUX 122 to constitute the system clock CKS'. Referring to FIG. 5, such a selection change is depicted at time 168. Once again, note the effective shortening by a half of the low half cycle and a half of the high half cycle, of clock CKS' at time 168 as a result of this selection change.

Now, the value N, i.e., 125 in this example, is loaded initially into down counter 102 via bus 126. Clock CKR is applied to the CLOCK input of down counter 102 and it begins counting down from 125. When the value at the output of counter 102, on bus 130, is zero, the comparison in comparator 106 against the zero value on bus 132 is true. As a result, line 134, the output of comparator 106, goes high for one cycle. This causes two things to occur; down counter 102 again loads the value N from bus 126, causing the entire sequence to begin again, and, in addition, down counter 108 is reset. Thus, down counter 108 again starts to count down from J, i.e. 41, at the beginning of a new sequence of N CKR clocks, assuring the appropriate number of corrections to achieve the desired result.

Note that in FIG. 5, similar to FIG. 3, the number of cycles depicted between transition times 164, 166 and 168 is arbitrary. The figure merely illustrates what happens at transitions. The timing at which the actual transitions occur is described in conjunction with the operation of the circuit of FIG. 4, above.

Also note that as a result of the transitions and their timings, as described above, every N cycles of CKR J corrections are made to clock CKS' of order magnitude CKR, or ½ CKS. Thus, as before, the desired result is obtained.

A third preferred embodiment is shown in FIGS. 6, 7 and 8. In FIG. 6 are a first fast flip-flop 170, a second fast flip-flop 172, a first MUX 174, a second MUX 176, a third MUX 178, a first inverter 180, a second inverter 182 and a third inverter 184. Reference clock signal CKR is provided on input line 186 to the CLOCK input of fast flip-flop 170 and to the input of inverter 182. The output of inverter 182 is provided on line 188 to the CLOCK input of fast flip-flop 172. Select signal S1 is provided on line 190 to the SELECT input of MUX 174. Select signal S2 is provided on line 192 to the SELECT input of MUX 176. Select signal S3 is provided on line 194 to the SELECT input of MUX 178.

The Q output of fast flip-flop 170, which is the clock signal CK1/2A, is provided on line 196 to the input of inverter 180 and to the "0" input of MUX 178. The output of inverter 180 is provided on line 198 to the "1" input of MUX 176 and to the "0" input of MUX 174. The output of MUX 176 is provided on line 200 to the D input of fast flip-flop 172. The Q output of fast flip-flop 172, which is the clock signal CK1/2B, is provided on line 202 to the "1" input of MUX 178 and to the input of inverter 184. The output of inverter 184 is provided on line 204 to the "0" input of MUX 174 and to the "0" input of MUX 176. The output of MUX 178, which is the system clock signal CKS", is provided on line 208.

The select signals S1, S2 and S3 are generated by the circuitry shown in FIG. 7 and FIG. 8. In FIG. 7 are a first fast flip-flop 210, a second fast flip-flop 212, a first inverter 214 and a second inverter 216. A clock signal XCLK is provided on line 218 to the CLOCK input of fast flip-flop 210. The Q output of fast flip-flop 210 is provided on line 222 to the input of inverter 214. The Q output of fast flip-flop 210 is the signal STATE 1. The output of inverter 214 is provided on line 224 to the D input of fast flip-flop 210 and to the D input of fast flip-flop 212. The output of inverter 214 is the signal STATE 2. The Q output of fast flip-flop 212 is provided on line 226 to the input of inverter 216. The Q output of fast flip-flop 212 is the signal STATE 2D. The output of inverter 216 is provided on line 228 and is the signal STATE 1D.

In FIG. 8 is a select signal generator 230 in which there are a first AND gate 232 and a second AND gate 234. The STATE 2 signal on line 224 (FIG. 7) is provided to a first input of AND gate 232. The STATE 1D signal on line 228 (FIG. 7) is provided to a second input of AND gate 232. The output of AND gate 232 is the signal S2 and is provided on line 192. The STATE 1 signal on line 222 (FIG. 7) is provided to a first input of AND gate 234. The STATE 2D signal on line 226 (FIG. 7) is provided to a second input of AND gate 234. The output of AND gate 234 is the signal S1 and is provided on line 190. The STATE 2D signal on line 226 is provided straight through the select signal generator 230, and is provided directly to line 194 as the signal S3.

Figure 9:
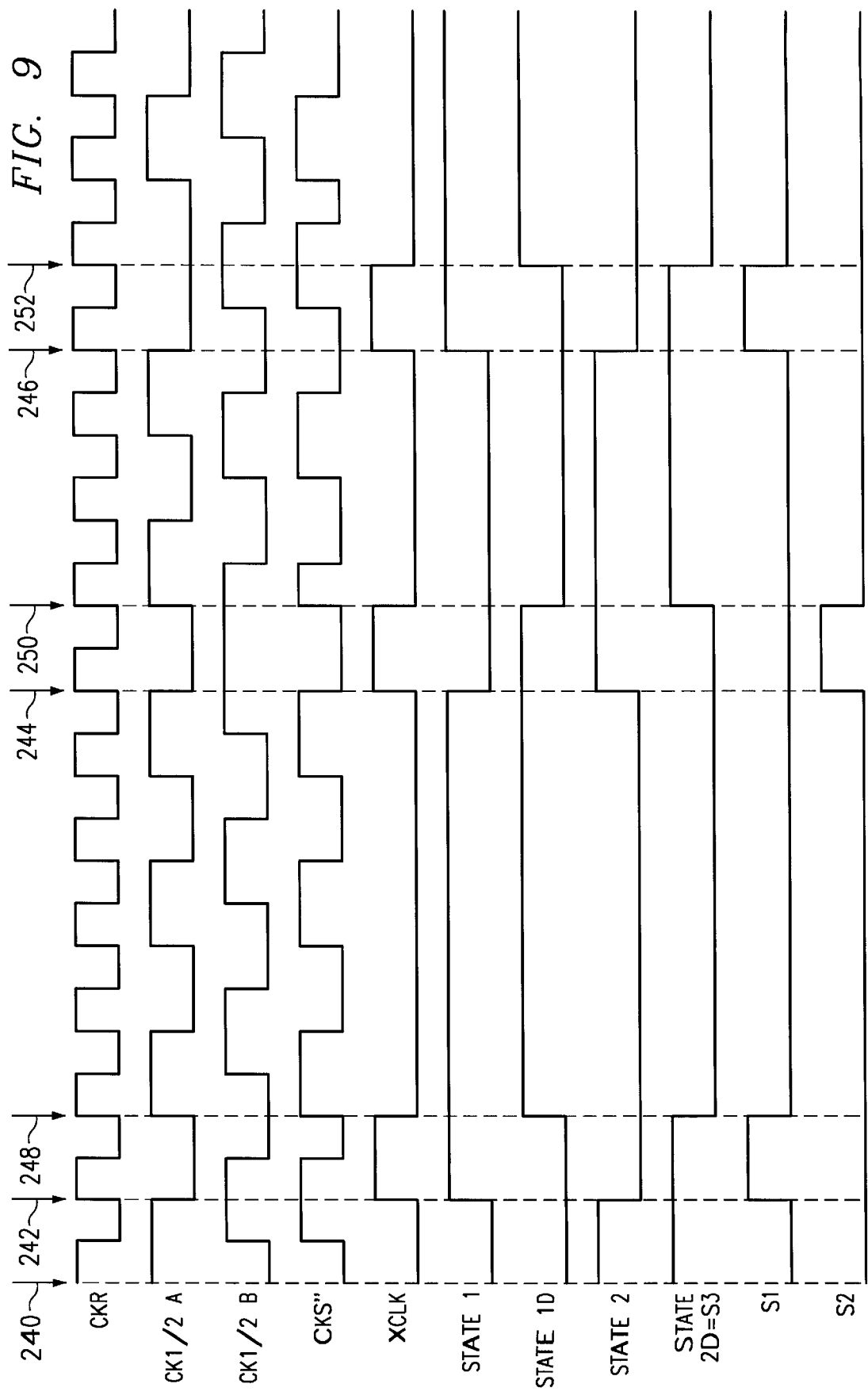
FIG. 9 is a signal timing diagram showing the time relationship between clock signals CKR, CK1/2A, CK1/2B, CKS", XCLK, STATE 1, STATE 1D, STATE 2, STATE 2D (=S3), S1 and S2, of FIGS. 6, 7 and 8.

FIG. 9 is a signal timing diagram showing the time relationship between clock signals CKR, CK1/2A, CK1/2B, CKS", XCLK, STATE 1, STATE 1D, STATE 2, STATE 2D (=S3), S1 and S2, with the X-axis representing time, starting with an initial time 240, and the Y-axes representing signal level of the respective clock signals, where the signal level for each of the respective clocks corresponds either to a digital "0" or "1."

The operation of the arrangement shown in FIGS. 6–8 will now be explained, with reference to the signal timing diagram of FIG. 9. The clock XCLK is the same as the clock XCLK shown in FIG. 5, and may be generated as described in connection with FIGS. 4 and 5. However, in this case, each correction to CKS" corresponds to ½ CKR. This is similar to the first embodiment of the invention.

Fast flip-flop 210 is configured as a toggle that changes states when clocked, due to the negative feedback path from its Q output to its D input through inverter 214. Thus, when XCLK on line 218 goes high, which is shown in FIG. 9 at times 242, 244 and 246, the Q output of flip-flop 210 changes state in response to the detected rising edge. This state is provided on line 222, and is the signal STATE 1. The output of inverter 214 is the inverse of the signal STATE 1, and is the signal STATE 2. It is provided on line 224 to the D input of fast flip-flop 212. Fast flip flop 212 is clocked by the rising edges of clock CKR, and so provides at its output, on line 226, the signal STATE 2 delayed by one period of clock CKR, which is the signal STATE 2D. The output of inverter 216 is provided on line 228 and is the inverse of the signal STATE 2D. Thus, the signal on line 228 is the same as the signal STATE 1 delayed by one period of clock CKR, and is the signal STATE 1D. As mentioned above, the delayed transitions of signals STATE 1D and STATE 2D occur one period of clock CKR later than the times when clock XCLK goes high, shown in FIG. 9 at times 248, 250 and 252.

The signals STATE 1, STATE 1D, STATE 2 and STATE 2D, generated as just described, are used in the arrangement shown in FIG. 8 to generate the signals S1, S2 and S3, which are, in turn, used in the arrangement shown in FIG. 6. Turning first to FIG. 8, it can be seen that the signal STATE 2 on line 224 and the signal STATE 1D on line 228 are provided each to an input of AND gate 232, the output of which is the signal S2. Thus, the signal S2 is low unless both STATE 2 and STATE 1D are high, which can be appreciated by a comparison of these three signals in FIG. 9.

Returning to FIG. 8, it can be seen that the signal STATE 1 on line 222 and the signal STATE 2D on line 226 are provided each to an input of AND gate 234, the output of which is the signal S1. Thus, the signal S1 is low unless both STATE 1 and STATE 2D are high, which can be appreciated by a comparison of these three signals in FIG. 9.

Finally, it can be seen in FIG. 8 that the signal STATE 2D is also provided directly to line 194, and becomes signal S3, as shown in FIG. 9.

Now, turning to FIG. 6, when S1 on line 190 is a "0", the "0" input of MUX 174 is selected. Thus, in this condition fast flip-flop 170 is configured as a toggle that changes states when clocked, due to the negative feedback path from its Q output to its D input through inverter 180, and MUX 174. Thus, when CKR goes high the Q output of flip-flop 170 on line 196, which is the signal CK1/2A, changes state. This sets up a steady state mode, when S1 is "0", for the signal CK1/2A, of a clock that is synchronous and rising edge coincident with clock CKR and twice the period of clock CKR, as shown in FIG. 9.

The output of flip-flop 170 on line 196 is provided to the input of inverter 180, the output of which is provided on line 198 to the "1" input of MUX 176.

Now, when S2 on line 192 is a "0", the "0" input of MUX 176 is selected. Thus, in this condition fast flip-flop 172 is configured as a toggle that changes states when clocked, due to the negative feedback path from its Q output to its D input through inverter 184, and MUX 176. Thus, when CKR goes low, so that the output of inverter 182 goes high, the Q output of flip-flop 172 on line 202, which is the signal CK1/2B, changes state. This sets up a steady state mode, when S2 is "0", for the signal CK1/2B, of a clock that is synchronous with clock CKR, having its rising edge coincident with the falling edge of clock CKR, and twice the period of clock CKR, as shown in FIG. 9.

Now, under control of signal S1 MUX 174 selects between the signal on line 198 and line 204 to provide to the D input of fast flip-flop 170. This change in state of signal S1 effectively causes the signal CK1/2B after inversion by Inverter 184 to pass through MUX 174 and be loaded into Fast Flip-Flop 170 at the next CKR rising edge, and thereby becomes the signal CK1/2A. This latter transaction is shown in FIG. 9 at times 248 and 252 with respect to the rising edge of CKR. As illustrated in FIG. 9, at times 248 and 252, these transactions have the effect of causing the relative phase of CK1/2A relative to CK1/2B to be such that the phase of CK1/2A leads that of CK1/2B by ¼ period. In a similar manner, when the state of signal S2 is high, then on the rising edge of CKR the state of CK1/2A, after inversion by Inverter 180, and through MUX 176, is loaded into Fast Flip-Flop 172, and thereby becomes the signal CK1/2B. As illustrated in FIG. 9, at time 250, this transaction has the effect of changing the relative phase of CK1/2B relative to CK1/2A such that the phase of CK1/2B leads that of CK1/2A by ¼ period.

The system clock CKS", the output of MUX 178, is identically CK1/2B when the state of signal S3 (=STATE 2D) is high and CK1/2A when S3 (=STATE 2D) is low. We note that S3 (=STATE 2D) changes state coincident with a CKR rising edge after S1 or S2 pulse high. With reference to FIG. 9, when S3 changes state from high to low at time 248, CKS", through MUX 178 (FIG. 6), changes from following CK1/2B to following CK1/2A. But, recall that at time 248 the signal CK1/2A, through the transactions associated with S1 pulsing high, as described above, leads CK1/2B by ¼ period at time 248. Consequently, when CKS" goes from following CK1/2B to CK1/2A, at time 248, the low period of CKS" is shortened by ½. This effectively causes a correction of CKS" by ¼ period. When S3 changes state from low to high at time 250, CKS", through MUX 178 (FIG. 6), goes from following CK1/2A to CK1/2B. But, recall that at time 250 the signal CK1/2B, through transactions associated with S2 pulsing high, as described above, leads CK1/2A by ¼ period. Consequently, when CKS" goes from following CK1/2A to CK1/2B, at time 250, the high period of CKS" is shortened by ½. This effectively causes a correction of CKS" by ¼ period. The sequence of events at time 252 are similar to those described previously, with respect to S1 pulsing high and shortening by ½ of the low period of CKS", and thereby effecting a ¼ period correction of CKS".

Although the present invention and its advantages have been described in detail, it should be understood that various changes, substitutions and alterations can be made herein without departing from the spirit and scope of the invention as defined by the appended claims. For example, it will be recalled that in the embodiments described above the simplification of Y=1 was made. Embodiments wherein such simplification is not made, but rather wherein Y is selected to be some other integer, while still in the order of ten or less, will readily occur to those of ordinary skill in the art, once the principles of the present invention, as set forth herein, are understood. Other variations are possible, as well.

What is claimed is:

1. A digital clock signal generator capable of generating an output clock signal having a frequency $f_O$ derived from a reference clock signal having a frequency $f_R$, such that $$f_O = \frac{M}{N} f_R,$$

is satisfied, wherein M and N are integers, comprising:
means for generating from said reference clock signal at least one intermediate clock signal having a frequency $f_X$, such that $$f_X = \frac{1}{X} f_R,$$

wherein X is an integer close in value to N/M, wherein X is expressed as the fraction P/M, wherein P is an integer; and means for providing a predetermined number of phase corrections of a predetermined magnitude, said magnitude having a predetermined time relationship to the period of said reference clock signal, to said intermediate clock signal at predetermined times such that over M periods of said reference clock signal |P-N| corrections of said predetermined magnitude to said intermediate clock signal are effectively made in the appropriate phase direction so as to derive said output clock signal such that the average frequency of said output clock signal over time is $f_O$.

2. A digital clock signal generator capable of generating an output clock signal having a frequency $f_O$ derived from a reference clock signal having a frequency $f_R$, such that $$f_0 = \frac{M}{N} f_R,$$

is satisfied, wherein M and N are integers, comprising:

an intermediate frequency signal generator, providing a number K of intermediate signals each having a frequency of a frequency $f_X$, such that $$f_X = \frac{1}{X} f_R,$$

wherein X is an integer close in value to N/M, wherein X is expressed as the fraction P/M, wherein P is an integer, and wherein each of said intermediate signals is shifted by a predetermined phase from each other;

a first down counter having a clock input for receiving said reference clock signal, having a data input for receiving a first initial count value, N, in response to a first load signal, having a load input for receiving said first load signal, and having an output;

a first memory for storing a value corresponding to N, coupled to said data input of said first down counter;

a first comparator having a first input thereof coupled to said output of said first down counter, having a second input thereof coupled to a value of zero, and having an output, said output of said first comparator being coupled to said load input of said first down counter;

a second down counter having a clock input for receiving said reference clock signal, having a data input for receiving a second initial count value, J, in response to a second load signal, having a load input for receiving said second load signal, having a reset input for receiving the output of said first comparator, and having an output;

a second memory for storing a value corresponding to J, where J is corresponds to P times the inverse of said phase shift, expressed as a fraction of a cycle, between said intermediate signals, coupled to said data input of said second down counter;

a second comparator having a first input thereof coupled to said output of said second down counter, having a second input thereof coupled to a value of zero, and having an output, said output of said second comparator being coupled to said load input of said second down counter;

a third down counter having a clock input for receiving said output of said second comparator, having a data input for receiving a third initial count value, K, in response to a third load signal, having a load input for receiving said third load signal, and having an output;

a third memory for storing a value corresponding to K;

a third comparator having a first input thereof coupled to said output of said third down counter, having a second input coupled to a value of zero, and having an output coupled to said load input of said third down counter; and a multiplexer receiving as inputs thereto said K intermediate signals, and receiving at a select input said output of said third down counter.

3. A method for generating an output clock signal having a frequency $f_O$ from a reference clock signal having a frequency $f_R$, such that $$f_0 = \frac{M}{N} f_R,$$

is satisfied, wherein M and N are integers and M<N, comprising the steps of:

providing a plurality of intermediate clock signals having a frequency $f_X$, such that $$f_X = \frac{1}{X} f_R,$$

wherein X is an integer close in value to N/M, and having a predetermined phase relationship with respect to one another; and selecting among said intermediate clock signals to provide said output clock signal according to a predetermined sequence applied so as to cause a phase correction at each change of selection such that the cumulative phase correction results in said output clock signal having, on average, said frequency $f_O$.

4. A method for generating an output clock signal having a frequency $f_O$ derived from a reference clock signal having a frequency $f_R$, such that $$f_0 = \frac{M}{N} f_R,$$

is satisfied, wherein M and N are integers such that $$\frac{N}{M}$$

is approximately two, comprising the steps of:

providing two intermediate clock signals having a frequency of one half of $f_R$ and being 180 out of phase with respect to one another; and selecting between said intermediate clock signals to provide said output clock signal according to a predetermined sequence applied so as to cause a phase correction at each change of selection such that the cumulative phase correction results in said output clock signal having, on average, said frequency $f_O$.

* * * * *